United States Patent [19]
Sawada

[11] Patent Number: 5,988,773
[45] Date of Patent: Nov. 23, 1999

[54] REPLACEMENT-PERIOD DETECTION METHOD AND VEHICLE CONTROL APPARATUS CAPABLE OF NOTIFYING REPLACEMENT PERIOD OF ACTUATOR

[75] Inventor: Mamoru Sawada, Yokkaichi, Japan

[73] Assignee: Denso Corporation, Kariya, Japan

[21] Appl. No.: 08/953,482

[22] Filed: Oct. 17, 1997

[30] Foreign Application Priority Data

Oct. 17, 1996 [JP] Japan ................................. 8-274957

[51] Int. Cl.$^6$ ........................................... B60T 8/88
[52] U.S. Cl. .................. 303/122.08; 188/1.11 E
[58] Field of Search ...................... 303/122, 122.03, 303/122.08, 191; 188/1.11 R, 1.11 E; 340/439, 438, 457.4; 701/29, 30, 35

[56] References Cited

U.S. PATENT DOCUMENTS

| | | | |
|---|---|---|---|
| 4,404,641 | 9/1983 | Bazarnik | 340/457.4 |
| 4,478,521 | 10/1984 | Evans et al. | 340/457.4 |
| 4,525,782 | 6/1985 | Wohlfarth et al. | 340/457.4 |
| 4,612,623 | 9/1986 | Barzarnik | 340/457.4 |
| 4,884,054 | 11/1989 | Moon, Sr. | 340/457.4 |
| 5,492,394 | 2/1996 | Kusano et al. | |
| 5,623,247 | 4/1997 | Cardillo | 340/457.4 |

FOREIGN PATENT DOCUMENTS 5-170074  7/1993  Japan.

*Primary Examiner*—Robert J. Oberleitner
*Assistant Examiner*—Robert A. Siconolfi
*Attorney, Agent, or Firm*—Pillsbury Madison & Sutro, LLP

[57] ABSTRACT

A total conductance time with respect to each of control actuators is calculated. It is determined whether each of the control actuators has reached a replacement period by determining whether the total conductance time has exceeded a determination value representing an appropriate replacement period. Notification of a control actuator which has been determined to have reached the replacement period is performed by causing a notification light to be illuminated.

40 Claims, 4 Drawing Sheets

| ACTUATOR | TOTAL CONDUCT. TIME | K | NOTIFICATION |
|---|---|---|---|
| INCREASING VALVE 21 | 12341 Hr. | 10000 Hr. | YES |
| INCREASING VALVE 22 | 8760 Hr. | 10000 Hr. | NO |
| ⋮ | ⋮ | ⋮ | ⋮ |
| PUMP MOTOR | 37600 Hr. | 50000 Hr. | NO |
| ⋮ | ⋮ | ⋮ | ⋮ |

| ACTUATOR | TOTAL CONDUCT. TIME | K | NOTIFICATION |
|---|---|---|---|
| INCREASING VALVE 21 | 12341 Hr. | 10000 Hr. | YES |
| INCREASING VALVE 22 | 8760 Hr. | 10000 Hr. | NO |
| ⋮ | ⋮ | ⋮ | ⋮ |
| PUMP MOTOR | 37600 Hr. | 50000 Hr. | NO |
| ⋮ | ⋮ | ⋮ | ⋮ |

REPLACEMENT-PERIOD DETECTION METHOD AND VEHICLE CONTROL APPARATUS CAPABLE OF NOTIFYING REPLACEMENT PERIOD OF ACTUATOR

CROSS REFERENCE TO RELATED APPLICATION

This application is based upon and claims benefit of priority of prior Japanese Patent Application No. H. 8-274957 filed on Oct. 17, 1996, the contents of which are incorporated herein by reference.

BACKGROUND OF THE INVENTION

1. Field of the Invention

The present invention relates to a replacement-period detection method for detecting a replacement period of an actuator used in a vehicle control apparatus and a vehicle control apparatus provided with a control actuator of a motor, a solenoid, or the like, which can provide notification of the replacement period of the actuator.

2. Related Art

Conventionally, various types of control actuators which are driven by receiving a supply of electrical power are employed to control a traveling state or the like of a vehicle, such as a passenger car or a truck. For example, various types of control actuators such as an electrical pump motor to drive a hydraulic pump to supply brake-fluid pressure to a wheel cylinder, a solenoid (control valve) to control brake-fluid pressure applied to the wheel cylinder, and the like are disposed in a hydraulic circuit of a brake control apparatus.

A control actuator of this type ordinarily is periodically replaced at every certain interval (for example at a time of predetermined periodic inspection) so that breakdown does not occur during travel or the like.

For example, an electrical pump motor, when used for a prolonged period, wearing or the like of the brushes of the motor or of the eccentric portion of the pump drive unit may occur, or a solenoid, may leak brake fluid due to wear of a pedestal seal portion. Therefore, replacement of these control actuators at an appropriate time is important.

A usable period of a control actuator ordinarily becomes longer when an actuated frequency is low. However, depending on the vehicles (in particular with trucks) there may be a large disparity in travel distance (vehicle life). For that reason, there may be a large disparity in actuated frequency of the control actuator. As a result, when merely replaced periodically, even a control actuator which is still sufficiently usable may be replaced, and there existed a problem in that waste is increased.

Additionally, when a control actuator is designed to be suited to a vehicle having an extremely long traveling distance, a high-cost system results, which is not desirable.

SUMMARY OF THE INVENTION

In light of the foregoing problems it is an object of the present invention to provide, at low cost, a vehicle control apparatus in which a control actuator can be replaced at a suitable time, and a replacement-period detection method for detecting a suitable replacement period of the control actuator.

According to the present invention, in a vehicle control apparatus provided with a control actuator to be actuated by receiving an electrical-power supply, an actuated frequency of the control actuator is detected by a detecting device, and notification of a replacement period of the control actuator is provided by a notifying device in accordance with the actuated frequency. It is to be noted that the actuated frequency does not signify solely a frequency of number of times actuated, but signifies the degree (extent) of actuation, such as a total of actuated hours or the like.

That is to say, ordinarily, when the actuated frequency is high the period of deterioration of the control actuator is hastened, and on the other hand, when the actuated frequency is low the period of deterioration thereof is delayed. Therefore, in the present invention, the actuated frequency of the control actuator is detected, and in a case where the detected actuated frequency has reached an actuated frequency corresponding to a predetermined replacement period, notification to this effect is made. Owing to this, the control actuator can be replaced at a suitable time, and so trouble due to deterioration of the control actuator can be prevented. In addition, waste due to unnecessary replacement of the control actuator is eliminated. Further, because no need exists to employ a control actuator having excessive durability, there is an advantage in terms of cost. Furthermore, with regard to a control actuator with an extremely high actuated frequency, the control actuator can be replaced at an early time. For this reason, there exists an effect in that safety is further enhanced.

A device for controlling a device actuated by fluid may be employed as the control actuator. That is to say, a device, such as for example a braking device, actuated by fluid in a vehicle ordinarily is subject to high pressure in its utilization, and moreover is important in control of the vehicle. Therefore, knowing the suitable replacement period of a control actuator utilized to control the device such as this is extremely important from the standpoint of safety. In particular, even in a case where the actuated frequency is greater than what is expected, the control actuator can be replaced prior to exceeding the suitable replacement period on a basis of this notification of the replacement period, and so a contribution is made to further enhancing safety.

A brake-fluid pressure regulating device which regulates brake fluid pressure supplied to wheel-braking torque generating device (for example a wheel cylinder) to generate wheel-braking torque during braking of a vehicle may be employed as the control actuator. As has been described above, the control actuator utilized in regulation of brake-fluid pressure is extremely important from the standpoint of safety, and so by knowing the suitable replacement period of the control actuator, the control actuator can be appropriately replaced irrespectively of the ordinary replacement period. As a result, not only can wasteful replacement be eliminated, but safety is further enhanced.

An electrical pump motor to cause a pump for taking in and discharging brake fluid to be actuated or a control valve to interrupt and communicate flow of the brake fluid may be employed as the control actuator. Accordingly, the electrical pump motor or control valve which is a critical component of the hydraulic circuit of the brake control apparatus can be replaced with appropriate timing. In particular, with an electrical pump motor, wear or the like of the brushes of the motor or of the eccentric portion of the pump drive unit may occur, or with a solenoid, leakage of brake fluid due to wear of the pedestal seal portion therein may occur. However, according to the present invention, replacement of the electrical pump motor or the control valve before problems such as these occur is possible.

The actuated frequency of the control actuator can be detected from a total driven time of the control actuator. This total driven time corresponds to total conductance time wherein the control actuator is energized. When the driven time is lengthy, ordinarily, the timing with which the control actuator deteriorates is hastened. Even in that case, the appropriate replacement period can be known from the total driven time of the control actuator.

The actuated frequency of the control actuator can be also detected from a number of times the control actuator is driven. When the number of times that the control actuator is driven is large, it is conceivable that, ordinarily, the timing with which the control actuator deteriorates is hastened. For this reason, the appropriate replacement period can be known from the number of times the control actuator is driven.

In a vehicle control apparatus provided with a control actuator to be actuated by receiving an electrical-power supply, actuated frequency of the control actuator is detected by a detecting device, the actuated frequency may be stored by a storing device. The actuated frequency can be output when there is an output request from an external portion. According to this structure, it is understood on a basis of the stored actuated-frequency data to what extent the control actuator is utilized, and so the suitable replacement period of the control actuator also comes to be understood.

BRIEF DESCRIPTION OF THE DRAWINGS

These and other objects, features and characteristics of the present invention will be appreciated from a study of the following detailed description, the appended claims, and drawings, all of which form a part of this application. In the drawings:

DETAILED DESCRIPTION OF THE PREFERRED EMBODIMENTS

A vehicle control apparatus and method according to the present invention will be described in detail hereinafter with embodiments, with reference to the drawings.

First Embodiment

The present embodiment applies the present invention in a brake control apparatus, which is one of the vehicle control apparatuses. The brake control apparatus stores an actuated frequency of a control actuator such as an electrical pump motor or a control valve (solenoid) of various types. When the actuated frequency has reached an actuated frequency corresponding to a predetermined replacement period, the brake control apparatus automatically makes a notification to this effect.

Figure 1:
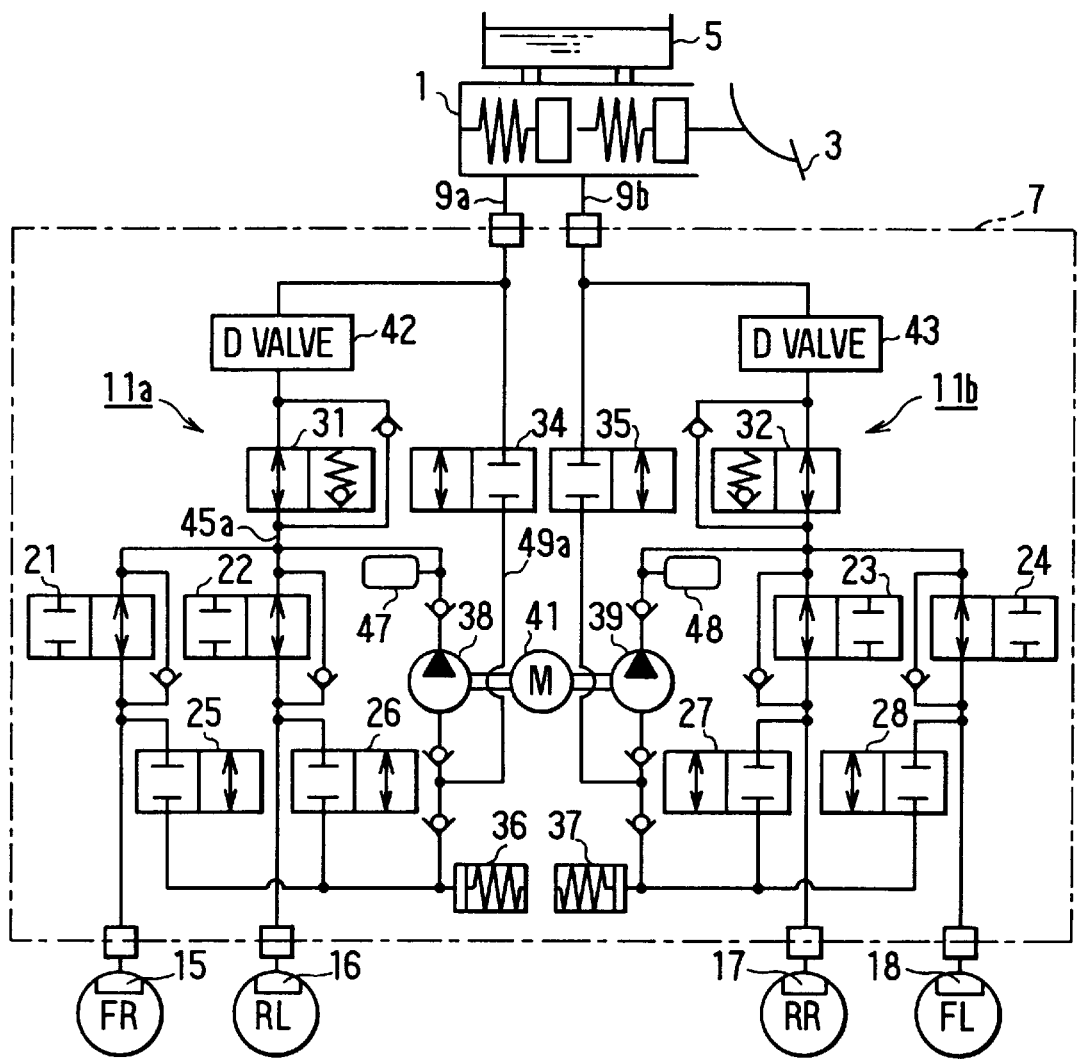
FIG. 1 is a schematic structural view of a brake control apparatus in which a vehicle control apparatus according to a first embodiment is employed, and peripheral structure thereof.

FIG. 1 is a schematic structural view illustrating the brake control apparatus for automotive use and peripheral structure thereof which can perform traction control (TRC control) and anti-skid control (ABS control) of known art, as well as power-brake control (PB control) which can further raise braking torque more than ordinarily.

As shown in FIG. 1, the brake control apparatus is provided with a master cylinder 1 of tandem type. Connected to this master cylinder 1 are a brake pedal 3, a master reservoir 5, and a hydraulic control circuit 7 made up of two hydraulic systems of X piping (diagonal piping) to regulate brake-fluid pressure. In detail, the master cylinder 1 is respectively connected via two fluid conduits 9a and 9b to first hydraulic piping 11a and second hydraulic piping 11b making up the hydraulic control circuit 7.

In the foregoing hydraulic control circuit 7, a wheel cylinder 15 of a front-right (FR) wheel and a wheel cylinder 16 of a rear-left (RL) wheel are communicated via the first hydraulic piping 11a. Additionally, a wheel cylinder 17 of a rear-right (RR) wheel and a wheel cylinder 18 of a front-left (FL) wheel are communicated via the second hydraulic piping 11b.

Accordingly, a pressure-increasing control valve 21 and a pressure-reducing control valve 25 of known art for controlling the hydraulic pressure of the wheel cylinder 15 of the FR wheel and a pressure-increasing control valve 22 and a pressure-reducing control valve 26 for controlling the hydraulic pressure of the wheel cylinder 16 of the RL wheel are provided in the first hydraulic piping 11a. A pressure-increasing control valve 23 and a pressure-reducing control valve 27 for controlling the hydraulic pressure of the wheel cylinder 17 of the RR wheel and a pressure-increasing control valve 24 and a pressure-reducing control valve 28 for controlling the hydraulic pressure of the wheel cylinder 18 of the FL wheel are provided in the second hydraulic piping 11b.

Further, in the foregoing first hydraulic piping 11a, a master-cylinder cut-off valve (SMC valve) 31 to communicate and interrupt a hydraulic path 45a on the master-cylinder 1 side from the respective pressure-increasing control valves 21 and 22 and a D valve 42 to increase pressure on the wheel-cylinder 15 and 16 side are provided. The SMC valve 31 is structured so that a passage is opened in a case where the pressure on the wheel-cylinder 15 and 16 side has become high.

This D valve 42 is utilized in the above-mentioned PB control, and is a reverse-connected proportioning valve (P valve). A proportioning valve is ordinarily employed for boosting wheel-cylinder pressure on a front-wheel side over a rear-wheel side in the same hydraulic piping, as well known. Consequently, due to this reverse-connected proportioning valve, when for example a hydraulic pump 38 has been driven, not only are the hydraulic pressures on the hydraulic path 45a side and the master-cylinder 1 side both increased, but in particular it is possible to greatly increase pressure on the hydraulic path 45a side over the master-cylinder 1 side.

Additionally, a reservoir 36 to temporarily store brake fluid discharged from the respective pressure-reducing control valves 25 and 26 and a hydraulic pump 38 for sending brake fluid under pressure to the hydraulic path 45a are disposed in the first hydraulic piping 11a. Further, an accumulator 47 to suppress internal hydraulic pulsation is disposed in the discharge path of brake fluid from the hydraulic pump 38.

Moreover, a hydraulic path 49a for supplying brake fluid directly from the master cylinder 1 to the hydraulic pump 38 when increasing wheel-cylinder pressure during traction control or the like is provided in the first hydraulic piping 11a, and in this hydraulic path 49a is disposed a reservoir cut-off valve (SRC valve) 34 to communicate and interrupt this hydraulic path 49a.

Meanwhile, in the second hydraulic piping 11b, similar to the foregoing first hydraulic piping 11a, pressure-increasing control valves 23 and 24, pressure-reducing control valves 27 and 28, an SMC valve 32, a D valve 43, a reservoir 37, a hydraulic pump 39, an accumulator 48, an SRC valve 35, and so on are disposed in similar locations.

Further, the above-described two hydraulic pumps 38 and 39 are structured to be interconnected with an electrical pump motor 41 and driven thereby.

Figures 2, 3:
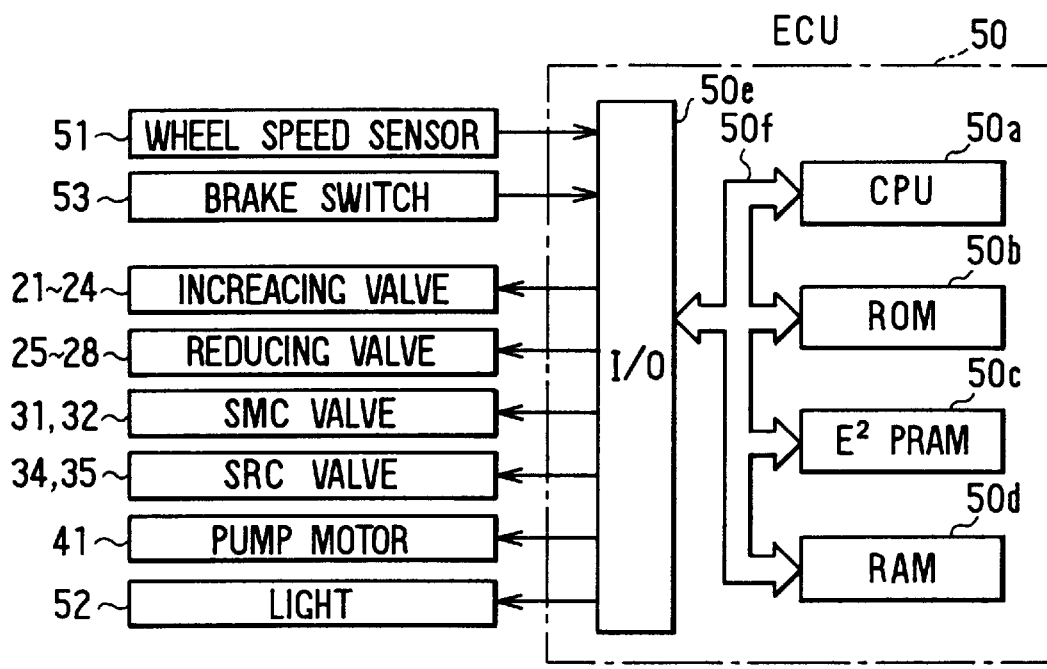
FIG. 2 is a block diagram illustrating a structure of an electronic control apparatus according to the first embodiment.
FIG. 3 is an explanatory diagram illustrating data stored in an E$^2$PROM and so on in the first embodiment.

As shown in FIG. 2, an ECU 50 to control the above-described brake control apparatus is structured primarily by a microprocessor provided with a CPU 50a, a ROM 50b, an E$^2$PROM 50c, a RAM 50d, an input/output portion 50e, a bus line 50f, and so on of known art. Because this E$^2$PROM 50c is a nonvolatile memory which does not require a backup power source, memory thereof is maintained even when an ignition switch is turned off.

Signals from wheel-speed sensors 51 disposed at respective wheels, a brake switch 53, and the like are input to the foregoing ECU 50. Additionally, control signals to drive the control actuators of the pressure-increasing control valves 21 through 24, the pressure-reducing control valves 25 through 28, the SMC valves 31 and 32, and the SRC valves 34 and 35, which are solenoids, and the electrical pump motor 41, and the like are output from the ECU 50. In addition, a signal for performing energization of a notification light 52 to provide notification that the replacement period of each of the control actuators has been reached is also output from the ECU 50.

In particular, with the present embodiment, the times for which the respective control actuators were energized are determined according to the foregoing control signals. As shown in FIG. 3, a total conductance time to which the conductance times thereof are added is sequentially stored, for each of the control actuators, in the foregoing E$^2$PROM 50c. Additionally, a conductance time for replacement (determination value K) corresponding to the appropriate replacement period of each of the control actuators is stored in the ROM 50b to provide notification of the replacement periods of the respective control actuators. Further, because the replacement periods of the control actuators differ from one another, the determination values K also differ for each control actuator, as shown in FIG. 3.

Figure 4:
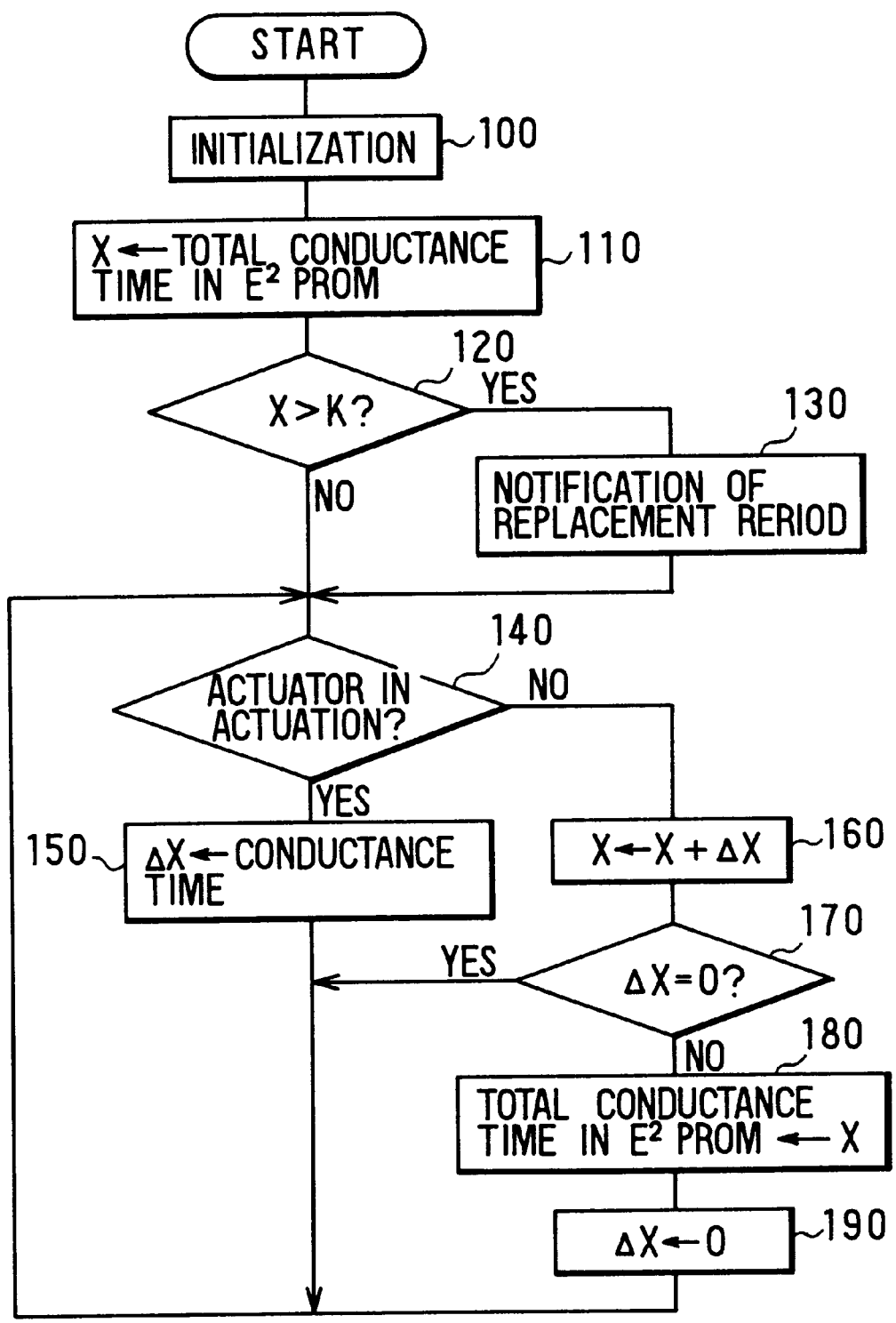
FIG. 4 is a flowchart illustrating control processing according to the first embodiment.

Next, control in the present embodiment will be described with reference to the flowchart of FIG. 4. The present processing is executed each time the ignition switch has been turned on.

When the ignition switch has been turned on, in step 100 of FIG. 4, initialization settings such as for example clearing a value of ΔX, which will be described later, are performed.

In the subsequent step 110, a total conductance time stored for each of the control actuators is read out from the E$^2$PROM 50c, and taken to be the value of X.

In the subsequent step 120, it is determined whether the control actuator has reached the replacement period by determining whether the value of X representing the total conductance time has exceeded the determination value K which is the conductance time representing the appropriate replacement period with respect to each of the control actuators. When an affirmative determination is made herein, processing advances to step 130; meanwhile, when a negative determination is made, processing advances to step 140.

In step 130, notification of a control actuator which has been determined to have reached the replacement period is performed. For example, the notification light 52 disposed on an instrument panel of the vehicle is caused to illuminate (or to flash) to provide notification of the replacement period, and processing advances to step 140.

In step 140, it is determined whether the control actuator is being actuated. When an affirmative determination is made herein, processing advances to step 150; meanwhile, when a negative determination is made, processing advances to step 160.

In step 150, the present conductance time of the control actuator is derived from the "on" time of the above-described control signal and taken to be the value of ΔX, and processing returns to the foregoing step 140.

Meanwhile, in step 160, because actuation of the control actuator has stopped, the value of ΔX representing the present conductance time derived in the foregoing step 150 is added to the value of X indicating the total conductance time added up to the previous control time, and the value of X is updated.

In the subsequent step 170, it is determined whether the value of ΔX is 0. When an affirmative determination is made herein, processing returns to the foregoing step 140; meanwhile, when a negative determination is made, processing advances to step 180.

In step 180, the value of X derived in the foregoing step 160 is written to the E$^2$PROM 50c as the total conductance time, and the data thereof is updated.

In the subsequent step 190, the value of ΔX is set to 0, and processing returns to the foregoing step 140.

In this way, with the present embodiment, the total conductance time of each of the control actuators is derived, and in a case where this total conductance time exceeds the determination value K, notification of the replacement period of the control actuator is performed by the notification light 52.

For this reason, the control actuator can be replaced at a suitable time, and so trouble due to deterioration of the control actuator can be prevented. In addition, waste due to unnecessary replacement of the control actuator is eliminated. Further, because no need exists to employ a control actuator having excessive durability, there is an advantage in terms of cost. Furthermore, with regard to a control actuator with an extremely high actuated frequency, the control actuator can be replaced at an early time, and so there exists an effect in that safety is further enhanced.

In particular, in a case of an apparatus wherein high stress due to high brake-fluid pressure is applied to the several control actuators, as in the hydraulic control circuit 7 of the brake control apparatus, the state of deterioration of the control actuators varies greatly according to the actuated frequency thereof, and so performing notification of the replacement period of each of the control actuators on a basis of the actuated frequency as in the present embodiment is extremely useful.

Further, in a case where a control actuator has been replaced, need exists to reset the total conductance time of the control actuator stored in the E$^2$PROM 50c. As a method for this, a method in which an instrument for input use is connected to the ECU 50 for example at a time of replacement of the control actuator, a predetermined instruction is directly input to the ECU 50, and the data for total conductance time in the E$^2$PROM 50c is reset may be employed.

Second Embodiment

Next, a second embodiment will be described, but description of portions similar to the foregoing first embodiment will be omitted or simplified.

The present embodiment relates to a replacement-period detection method to be utilized in a vehicle control apparatus, and stores a number of times actuated of a control actuator, such as an electrical pump motor or a control valve in a brake control apparatus, obtains this number of times actuated by a checker at the time of periodic inspection or the like, and detects the replacement period of the control actuator.

Figure 5:
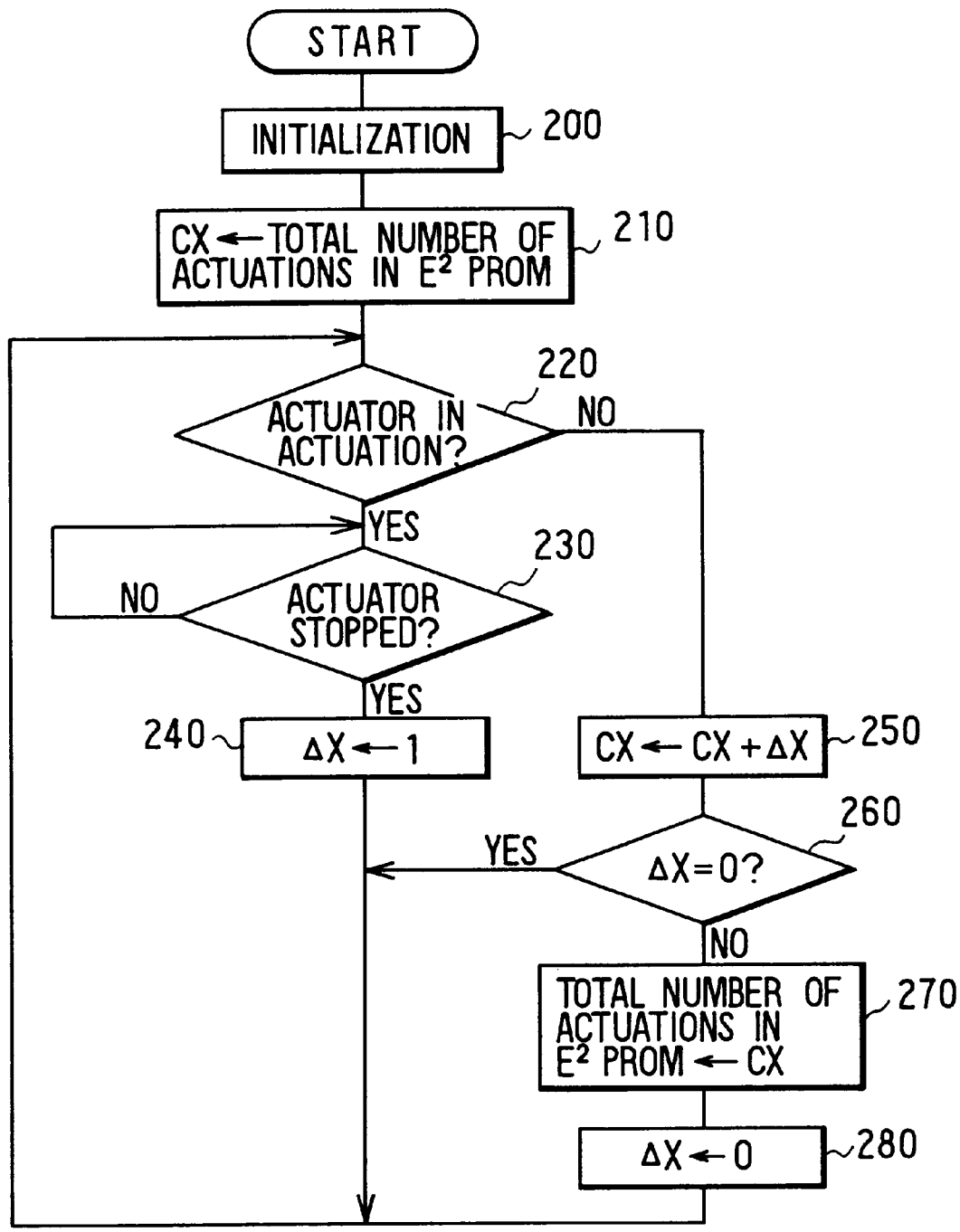
FIG. 5 is a flowchart illustrating control processing according to a second embodiment.

Because, the hardware structure of the vehicle control apparatus employed in the present embodiment is substantially similar to the foregoing first embodiment (however, a notification light is unnecessary), control processing to store the number of times actuated will be described with reference to the flowchart of FIG. 5. Further, the numbers which are the same as the first embodiment will be employed for the same parts.

In a case where the ignition switch has been turned on, in step 200 of FIG. 5, initialization settings such as for example clearing a value of ΔCX, which will be described later, are performed.

In the subsequent step 210, a total number of actuations stored for each of control actuators is read out from the E²PROM 50c, and taken to be the value of CX.

In the subsequent step 220, it is determined whether the control actuator is being actuated. When an affirmative determination is made herein, processing advances to step 230; meanwhile, when a negative determination is made, processing advances to step 250.

In step 230, it is determined whether the control actuator has stopped. When an affirmative determination is made herein, processing advances to step 240; meanwhile, when a negative determination is made, the same determination is repeated.

In step 240, the value of ΔCX is set to 1 to indicate the single actuation of the control actuator, and processing returns to the foregoing step 220.

Meanwhile, in step 250 to which processing advances when a negative determination is made in step 220, because actuation of the control actuator has stopped, the value of the above-described ΔCX is added to the value of CX indicating the total number of actuations added up to the previous control time, and the value of CX is updated.

That is to say, the value of CX indicating the number of times actuated is sequentially added with each single actuation of the control actuator by processing of the foregoing steps 220 through 250.

In the subsequent step 260, it is determined whether the value of ΔX is 0. When an affirmative determination is made herein, processing returns to the foregoing step 220; meanwhile, when a negative determination is made, processing advances to step 270.

In step 270, the value of CX derived in the foregoing step 250 is written to the E²PROM 50c as the total number of actuations, and the data thereof is updated.

In the subsequent step 280, the value of ΔCX is set to 0, and processing returns to the foregoing step 220.

That is to say, the total number of actuations of the control actuator is stored in the E²PROM 50c by the processing of these steps 200 through 280.

Consequently, it is possible, for example at a time of replacement of the control actuator, to connect a checker to the input/output portion 50e of the ECU 50, input a predetermined instruction directly to the ECU 50, and read out the data for total number of actuations from the E²PROM 50c. Accordingly, by replacing the control actuator when, for example, the total number of actuations of the control actuator has exceeded a determination value for a number of actuations representing the replacement period, based on the data for total number of actuations, wasteful replacement is reduced and lower cost can be achieved, similar to the first embodiment, and an effect wherein a contribution is made also to improve safety is also demonstrated.

Further, in order to prevent arrival of the replacement period of the control actuator until the next inspection period even if the total number of actuations obtained at the present inspection time is acceptable, it is preferred that the value of this determination value be established at a somewhat low value.

Additionally, it need hardly be said that the present invention is not restricted in any way to the above-described embodiments, and can be embodied in various modes which do not deviate from the technical scope of the present invention.

For example, a hydraulic control circuit of various types can be employed as an alternative to the hydraulic control circuit of the above-described first and second embodiments.

In the foregoing first and second embodiments, a control actuator to be actuated by receiving an electrical-power supply was described, but because it is believed that deterioration proceeds similarly with respect also to a device actuated by being interlinked with the control actuator, for example as in a hydraulic pump driven by an electrical pump motor, notification of the replacement period of the device can similarly be provided on a basis of the actuated frequency of the control actuator.

Additionally, the present invention can be applied not merely in a control actuator utilized in a hydraulic control circuit of a brake control apparatus, but also in a control actuator utilized for example in a device actuated by hydraulic pressure of power steering or the like, or a control actuator utilized in a device actuated irrespectively of hydraulic pressure.

Furthermore, with the foregoing first and second embodiments, the actuated frequency was detected with the total time or the total number of times actuated of the respective control actuators, and the respective control actuators were replaced as required. However, in a case where a total number of times performed of a certain particular control is detected and the number of times performed of this control has exceeded a determination value, for example in an ABS control, all control actuators or a particular control actuator (for example a pressure-increasing control valve or a pressure-reducing control valve) relating for example to ABS control may be replaced. This can otherwise be said also for TRC control and PB control.

What is claimed is:

1. A vehicle control apparatus provided with a control actuator to be actuated by receiving an electrical power supply, said vehicle control apparatus comprising:

detecting means for detecting an actuated frequency of said control actuator; and notifying means for providing a notification of a period for replacement of said control actuator in accordance with said actuated frequency detected by said detecting means, wherein said control actuator is a device for controlling an apparatus actuated by a fluid, and said control actuator is for regulating brake-fluid pressure supplied to wheel-braking torque generating means for generating a wheel-braking torque during braking of a vehicle.

2. A vehicle control apparatus as recited in claim 1, wherein said control actuator is a pump motor constructed and arranged to cause a pump to take in and discharge brake fluid to be actuated.

3. A vehicle control apparatus as recited in claim 1, wherein said actuated frequency of said control actuator is detected from a total driven time of said control actuator.

4. A vehicle control apparatus as recited in claim 1, wherein said notifying means provides a notification of a period for replacement of said control actuator when said actuated frequency detected by said detecting means has reached a predetermined determination value.

5. A vehicle control apparatus as recited in claim 4, wherein said control actuator includes different types of actuators, and said predetermined determination value is set to different values in accordance with said different types of actuators.

6. A vehicle control as recited in claim 1, further comprising:
   storing means for storing said actuated frequency detected by said detecting means; and
   outputting means for outputting said actuated frequency from said storing means in accordance with an output request, wherein
   said actuated frequency of said control actuator is utilized in detection of a period for replacement of said control actuator.

7. A vehicle control as recited in claim 6, wherein said actuated frequency of said control actuator is detected from a total driven time of said control actuator.

8. A vehicle control as recited in claim 6, wherein said actuated frequency of said control actuator is detected from a number of times said control actuator is driven.

9. A vehicle control apparatus as recited in claim 1, wherein said control actuator is a control valve constructed and arranged to interrupt and communicate a flow of said brake fluid.

10. A replacement-period detection method for a vehicle control apparatus provided with a control actuator to be actuated by receiving an electrical power supply, said replacement-period detection method comprising acts of:
    detecting an actuated frequency of said control actuator utilized in a detection of a period for replacement of said control actuator;
    determining whether said actuated frequency detected by said detecting act has reached a predetermined determination value corresponding to an appropriate replacement period of said control actuator; and
    providing a notification that said control actuator is to be replaced when said determining act has determined that said actuated frequency has reached said predetermined determination value, wherein
    said actuated frequency of said control actuator is detected from a number of times said control actuator is driven.

11. A replacement-period detection method as recited in claim 10, wherein said control actuator includes different types of actuators, and said predetermined determination value is set to different values in accordance with said different types of actuators.

12. A vehicle control apparatus provided with a control actuator to be actuated by receiving an electrical power supply, said vehicle control apparatus comprising:
    detecting means for detecting an actuated frequency of said control actuator; and
    notifying means for providing a notification of a period for replacement of said control actuator in accordance with said actuated frequency detected by said detecting means, wherein
    said actuated frequency of said control actuator is detected from a number of times said control actuator is driven.

13. A vehicle control apparatus as recited in claim 12, wherein said control actuator is a device for controlling an apparatus actuated by a fluid.

14. A vehicle control apparatus as recited in claim 12, wherein said control actuator is a device for regulating brake-fluid pressure supplied to wheel-braking torque generating means for generating a wheel-braking torque during braking of a vehicle.

15. A vehicle control apparatus as recited in claim 12, wherein said control actuator is a pump motor constructed and arranged to cause a pump to take in and discharge brake fluid to be actuated.

16. A vehicle control apparatus as recited in claim 12, wherein said control actuator is a control valve constructed and arranged to interrupt and communicate a flow of said brake fluid.

17. A vehicle control apparatus as recited in claim 12, wherein said actuated frequency of said control actuator is detected from a total driven time of said control actuator.

18. A vehicle control apparatus as recited in claim 12 wherein said notifying means provides a notification of a period for replacement of said control actuator when said actuated frequency detected by said detecting means has reached a predetermined determination value.

19. A vehicle control apparatus as recited in claim 18, wherein said control actuator includes different types of actuators, and said predetermined determination value is set to different values in accordance with said different types of actuators.

20. A vehicle control as recited in claim 12, further comprising:
    storing means for storing said actuated frequency detected by said detecting means; and
    outputting means for outputting said actuated frequency from said storing means in accordance with an output request from an outside, wherein
    said actuated frequency of said control actuator is utilized in detection of a period for replacement of said control actuator.

21. A vehicle control apparatus provided with a control actuator to be actuated by receiving an electrical power supply, said vehicle control apparatus comprising:
    a detector for detecting an actuated frequency of said control actuator; and
    an indicator for providing a notification of a period for replacement of said control actuator in accordance with said actuated frequency detected by said detector, wherein
    said control actuator is a device for controlling an apparatus actuated by a fluid, and
    said control actuator is for regulating brake-fluid pressure supplied to a wheel-braking torque generator for generating a wheel-braking torque during braking of a vehicle.

22. A vehicle control apparatus as recited in claim 21, wherein said control actuator is a pump motor constructed and arranged to cause a pump to take in and discharge brake fluid to be actuated.

23. A vehicle control apparatus as recited in claim 21, wherein said actuated frequency of said control actuator is detected from a total driven time of said control actuator.

24. A vehicle control apparatus as recited in claim 21, wherein said indicator provides a notification of a period for replacement of said control actuator when said actuated frequency detected by said detector has reached a predetermined determination value.

25. A vehicle control apparatus as recited in claim 24, wherein said control actuator includes different types of actuators, and said predetermined determination value is set to different values in accordance with said different types of actuators.

26. A vehicle control apparatus provided with a control actuator to be actuated by receiving an electrical power supply, said vehicle control apparatus comprising:

- a detector for detecting an actuated frequency of said control actuator utilized in detection of a period for replacement of said control actuator;
- a storage device for storing said actuated frequency detected by said detecting means; and
- an outputter for outputting said actuated frequency from said storage device in accordance with an output request from an outside, wherein
- said actuated frequency of said control actuator is detected from a number of times said control actuator is driven.

27. A vehicle control as recited in claim 21, further comprising:

- a storage device for storing said actuated frequency detected by said detector; and
- an outputter for outputting said actuated frequency from said storage device in accordance with an output request from an outside, wherein
- said actuated frequency of said control actuator is utilized in detection of a period for replacement of said control actuator.

28. A vehicle control as recited in claim 27, wherein said actuated frequency of said control actuator is detected from a total driven time of said control actuator.

29. A vehicle control as recited in claim 27, wherein said actuated frequency of said control actuator is detected from a number of times said control actuator is driven.

30. A vehicle control apparatus provided with a control actuator to be actuated by receiving an electrical power supply, said vehicle control apparatus comprising:

- a detector for detecting an actuated frequency of said control actuator; and
- an indicator for providing a notification of a period for replacement of said control actuator in accordance with said actuated frequency detected by said detector, wherein
- said actuated frequency of said control actuator is detected from a number of times said control actuator is driven.

31. A vehicle control apparatus as recited in claim 30, wherein said control actuator is a device for controlling an apparatus actuated by a fluid.

32. A vehicle control apparatus as recited in claim 30, wherein said control actuator is a device for regulating brake-fluid pressure supplied to a wheel-braking torque generator for generating a wheel-braking torque during braking of a vehicle.

33. A vehicle control apparatus as recited in claim 30 wherein said control actuator is a pump motor constructed and arranged to cause a pump to take in and discharge brake fluid to be actuated.

34. A vehicle control apparatus as recited in claim 30, wherein said control actuator is a control valve constructed and arranged to interrupt and communicate a flow of said brake fluid.

35. A vehicle control apparatus as recited in claim 30, wherein said actuated frequency of said control actuator is detected from a total driven time of said control actuator.

36. A vehicle control apparatus as recited in claim 30, wherein said indicator provides a notification of a period for replacement of said control actuator when said actuated frequency detected by said detector has reached a predetermined determination value.

37. A vehicle control apparatus as recited in claim 36, wherein said control actuator includes different types of actuators, and said predetermined determination value is set to different values in accordance with said different types of actuators.

38. A vehicle control as recited in claim 30, further comprising:

- a storage device for storing said actuated frequency detected by said detector; and
- an outputter for outputting said actuated frequency from said storage device in accordance with an output request from an outside, wherein
- said actuated frequency of said control actuator is utilized in detection of a period for replacement of said control actuator.

39. A vehicle control apparatus as recited in claim 21, wherein said control actuator is a control valve constructed and arranged to interrupt and communicate a flow of said brake fluid.

40. A vehicle control apparatus provided with a control actuator to be actuated by receiving an electrical power supply, said vehicle control apparatus comprising:

- detecting means for detecting an actuated frequency of said control actuator utilized in detection of a period for replacement of said control actuator;
- storing means for storing said actuated frequency detected by said detecting means; and
- outputting means for outputting said actuated frequency from said storing means in accordance with an output request, wherein
- said actuated frequency of said control actuator is detected from a number of times said control actuator is driven.

* * * * *